US009310901B2

(12) United States Patent
Wussler et al.

(10) Patent No.: US 9,310,901 B2
(45) Date of Patent: Apr. 12, 2016

(54) DETECTING A USER INPUT WITH AN INPUT DEVICE

(75) Inventors: René Wussler, Watt (CH); Robert Huber, Geroldswil (CH)

(73) Assignee: Studer Professional Audio Systems GmbH, Regensdorf (CH)

( * ) Notice: Subject to any disclaimer, the term of this patent is extended or adjusted under 35 U.S.C. 154(b) by 1049 days.

(21) Appl. No.: 12/621,388

(22) Filed: Nov. 18, 2009

(65) Prior Publication Data

US 2010/0214257 A1    Aug. 26, 2010

(30) Foreign Application Priority Data

Nov. 18, 2008   (EP) ..................................... 08020092

(51) Int. Cl.
  G06F 3/045    (2006.01)
  G06F 3/042    (2006.01)
  G06F 3/0362   (2013.01)
  G06F 3/039    (2013.01)

(52) U.S. Cl.
  CPC .............. G06F 3/0362 (2013.01); G06F 3/039 (2013.01); G06F 3/0421 (2013.01)

(58) Field of Classification Search
  None
  See application file for complete search history.

(56) References Cited

U.S. PATENT DOCUMENTS

| 4,655,552 | A | 4/1987 | Togashi et al. |
| 4,951,036 | A * | 8/1990 | Grueter .................. G03F 3/033 178/18.01 |
| 6,326,956 | B1 | 12/2001 | Jaeger et al. |
| 2003/0156100 | A1 | 8/2003 | Gettemy |
| 2005/0116937 | A1 | 6/2005 | Choi et al. |
| 2006/0007179 | A1* | 1/2006 | Pihlaja .......................... 345/173 |
| 2006/0033016 | A1 | 2/2006 | Ogawa et al. |
| 2006/0060644 | A1 | 3/2006 | Pihlaja |
| 2006/0086896 | A1 | 4/2006 | Han |
| 2006/0214893 | A1 | 9/2006 | Tseng et al. |
| 2006/0244693 | A1 | 11/2006 | Yamaguchi et al. |
| 2006/0256090 | A1 | 11/2006 | Huppi |
| 2006/0256093 | A1 | 11/2006 | Furukawa et al. |
| 2007/0268206 | A1 | 11/2007 | Kinoshita et al. |
| 2008/0129707 | A1* | 6/2008 | Pryor ............................ 345/175 |

(Continued)

FOREIGN PATENT DOCUMENTS

DE    20 2007 014 957 U1    1/2008
EP         0509589 A2        4/1992

(Continued)

OTHER PUBLICATIONS

Den Boer, Willem, et al.; Active Matrix LCD With Integrated Optical Touch Screen; SID 03 Digest; Planar Systems,Inc. Beaverton, Oregon, May 2003.

(Continued)

Primary Examiner — Christopher R Lamb
(74) Attorney, Agent, or Firm — Brooks Kushman P.C.

(57) ABSTRACT

An input device and methods for detecting user input using an input device. An example input device includes a multi-touch sensing display configured to detect multiple simultaneous triggers on a surface of the multi-touch sensing display as distinct input events. The input device also includes at least one mechanical control element arranged on the surface of the multi-touch sensing display. The at least one mechanical control element is configured to generate an input event. The input event is detected by the multi-touch sensing display in response to actuation of the at least one mechanical control element.

22 Claims, 8 Drawing Sheets

(56) References Cited

U.S. PATENT DOCUMENTS

2008/0238879 A1* 10/2008 Jaeger et al. .................. 345/173
2010/0079403 A1*  4/2010 Lynch et al. .................. 345/174

FOREIGN PATENT DOCUMENTS

| WO | WO 98/28760 A2 | 7/1998 |
| WO | WO 03/021913 A2 | 3/2003 |
| WO | WO 2005/091124 A1 | 9/2005 |
| WO | WO 2007/089049 A1 | 8/2007 |

OTHER PUBLICATIONS

European Search Report for corresponding European Application No. 08020092.6, mailed Mar. 2, 2009, 6 pages.
European Search Report for corresponding Application No. 14194724.2, mailed Mar. 19, 2015, 4 pages.

* cited by examiner

DETECTING A USER INPUT WITH AN INPUT DEVICE

RELATED APPLICATIONS

This application claims priority of European Patent Application Serial Number 08 020 092.6, filed on Nov. 18, 2008, titled "INPUT DEVICE AND METHOD OF DETECTING A USER INPUT WITH AN INPUT DEVICE," which application is incorporated in its entirety by reference in this application.

BACKGROUND

1. Field of the Invention

The invention relates to devices and methods for detecting user input, and more particularly, to an input device comprising a multi-touch sensing display.

2. Related Art

Modern electronic devices often use a plurality of control elements to allow a user to adjust parameters relevant to the operation of the device. An example of an input unit that may be used in an electronic device includes a console having a plurality of mechanical control elements. Such an input device may be used to control, for example, audio equipment, video equipment, or a central control station including, for example, a power plant, a factory, or a traffic system. Control elements employed in these systems include analog input elements.

Analog input elements have a predefined function. Their function cannot be changed or adjusted once implemented limiting their application in the input unit. Control elements that operate using encoders, such as for example, rotary encoders, are programmable as to their, function. However, in operation, it may be difficult or even impossible to determine the function that is assigned to the control element at any given time. It is even more difficult if the function and value of an associated parameter is displayed on a separate screen remote from the control element. Control elements that use encoders and other complex electromechanical input elements also tend to be relatively expensive and overly complex. Input units that use such electromechanical input elements must typically accommodate a fair amount of space underneath the cover plate of the input device, further adding to their cost and making them difficult to mount. Cost, expense and mounting difficulty present substantial problems for large input consoles that may include up to tens or hundreds of control elements.

Touchscreens are input devices often implemented in compact electronic devices, such as personal digital assistant (PDA) or more recently mobile phones. Touchscreens may use one of several known technologies for detecting a touch or a near-touch to a surface. One example includes a resistive touchscreen panel composed of several layers. When the panel is touched, a change in the electrical current through the layers may be detected as a touch event. A controller may derive the position of the touch event on the panel based on the change in current, which is different at any given position. Other touchscreen technologies include capacitive touchscreen panels based on detecting a distortion of an electromagnetic field, or frustrated total internal reflection (FTIR). Some FTIR touchscreen panels use reflected light paths in which a reflection light path internal to a glass plate provides a sensitive surface. A disturbance to the light path may be detected by pressing an object against the surface. These touchscreens can be operated with objects like a finger or a pen. Some touchscreen panels may trigger input events upon a near touch. For example, a capacitive touchscreen may trigger an input event if an object comes to within a predetermined distance of the touchscreen surface.

Touchscreens were originally designed to detect a single touch at a time. Touchscreens have since evolved to detect simultaneous multiple touches as separate input events. Such multi-touch screens allow a user to use two or more fingers to simultaneously manipulate two or more objects. Despite their flexibility, multi-touch screens are not well-suited for applications involving setting a larger number of parameters. The screens are generally small in size and operated by one hand. The adjustment of a graphical control element on the touchscreen using for example a finger or a pen may demand substantial motor skills from a user and yet, still be rather imprecise. A graphical control element typically requires a substantial amount of space on the screen limiting the number of such elements displayed at any given time. A plurality of small control elements would be difficult and time-consuming to operate. Adjusting a plurality of parameters with a conventional touchscreen is thus not ergonomic, particularly if such adjustments are to be performed over a prolonged time.

Accordingly, there is a need for an ergonomic input device that allows for flexible precise adjustment of parameters and that informs a user of the parameter being adjusted.

SUMMARY

Accordingly, there is a need to overcome or at least mitigate the above-mentioned drawbacks.

This need is met by the features of the independent claims. The dependent claims describe preferred embodiments of the invention.

According to a first aspect of the invention, an input device comprising a multi-touch sensing display adapted to detect multiple simultaneous touches or near touches to a surface of the multi-touch sensing display as distinct input events is provided. The input device comprises at least one mechanical control element arranged on the surface of the multi-touch sensing display. The at least one mechanical control element is configured such that an actuation of the at least one mechanical control element generates an input event which is detected by the multi-touch sensing display.

Using such an input device, a precise adjustment of a parameter associated with the mechanical control element can be achieved. As the control element is mechanical and can physically be actuated by a user, the user is enabled to make precise adjustments in an ergonomic way. Further, the mechanical control element can be compact and is still easy to use. As the mechanical control element may provide the input to the touchscreen, it can be freely configured, i.e. its functionality may be adjusted as desired. Even further, in such a configuration, it is possible to display the present functionality of the mechanical control element on the multi-touch sensing display in proximity to the control element. Thus, a user is enabled to immediately identify the functionality, thereby preventing confusion or a mix-up. This is particularly advantageous for applications where a multitude of control elements needs to be provided. Not only is it possible to display information in proximity to the control element with such an input device, but the area surrounding the control element is touch-sensitive, thus providing an additional possibility for a user input. As the display is multi-touch sensing, it is capable of detecting a simultaneous actuation of the control element and an input by touching the surface. Even further, the configuration of the input device with a multi-touch sensing display enables the arrangement of a plurality of mechanical control elements on the surface, which may be simultaneously actuated. Accordingly, an ergonomic adjustment of a plurality of parameters can be achieved with the input device. The functionality of control elements of the input device may be adjusted as desired, while still enabling a user to associate a particular functionality with the respective control element.

According to an embodiment of the invention, the at least one mechanical control element is mechanically mounted to the surface of the multi-touch sensing display. Mechanically mounting the control element may comprise but is not limited to adhering the control element to the service, e.g. using an adhesive, inserting one or more bolts into cavities or holes on the surface of the display, engaging or latching the control element with a structure on the surface, and the like. Mounting the mechanical control element in such a way has the advantage that it can be securely fixed to the surface, while requiring only little effort. Accordingly, the control element can time and cost efficiently be mounted to the surface. Mounting is further facilitated as the control element can have a very simple structure or design and may not require additional space underneath the surface of the multi-touch sensing display. Further, no additional support structures may be required on the surface, such as mounting bars or beams running across the surface. Even though the mechanical control element is mounted to the surface, the display and touch-sensitive area of the multi-touch sensing display can be kept large, as only a small area may be covered by the control element.

According to another embodiment, the input device comprises at least two mechanical control elements, wherein the multi-touch sensing display is adapted to detect a simultaneous actuation of the at least two mechanical control elements as separate input events. With such an input device, two or more parameters may be simultaneously adjusted. A great versatility of the input device is thus achieved.

According to a further embodiment, the at least one mechanical control element comprises a trigger element. When the trigger element touches the surface at a position or comes within a predetermined distance of the surface at the position, the trigger element triggers the input event at said position on the surface. The multi-touch sensing display is adapted to detect the position at which the input event is triggered. Using such a trigger element, a precise adjustment of a parameter associated with the mechanical control element may be achieved. It should be clear that if the trigger element is held at a position at which an input event is triggered, this may also be detected by the multi-touch sensing display, so that the actual position and thus the state of the control element may be determined. Configuring the multi-touch sensing display and the trigger element in such a way that an input event already occurs a predetermined distance of the surface has the advantage that the trigger element does not need to touch the surface, whereby frictional forces and abrasion of the display surface and the trigger element may be prevented.

The control element may comprise a movable component. The trigger element may then be arranged on the movable component such that when actuating the control element by moving the movable component, the multi-touch sensing display detects the movement of the trigger element relative to the surface. The control element may for example comprise an element fixedly mounted to the surface, the movable component being movable relative to said fixed component. When moving the movable component and thus the trigger element, successive input events may be triggered, which may enable a determination of the positioning of the movable component. With such an arrangement, a plurality of different types of control elements with different degrees of freedom can be realized.

As an example, the movable component may be formed so that when actuating the control element, the trigger element is moved in a plane substantially parallel to the surface at a distance to the surface at which it triggers an input event. Input events are then successively triggered for different positions on the surface. Using such an arrangement, control elements in form of a slider, a turn button, and others may be realized. As the positioning of such a control element may be simply read out by the multi-touch sensing display, the control element may not require any additional mechanical or electrical components, thus enabling the realization of plural more or less complex control elements with simple mechanics.

According to another example, the movable component may be formed so that when actuating the control element, the trigger element is moved substantially perpendicular to the surface between a position with a first distance to the surface and a position with a second distance to the surface chosen such that the movement of the trigger element triggers the input event. With such a design, a push button, a rocker, a joystick like element, or a similar control element may be realized. Again, such an element may have a very simple mechanical structure. It should be clear that the input device may comprise both an element wherein the trigger element is moved in a plane substantially parallel to the surface and an element wherein the trigger element is moved substantially perpendicular to the surface. Of course, it is also possible to combine both types of movement in a control element.

According to another embodiment, the input device further comprises a processing unit. The multi-touch sensing display is adapted to detect a position of the input event generated by said control element, and the processing unit is adapted to assign a value to a parameter controlled by said mechanical control element in dependence on the position at which the input event was detected. Accordingly, the setting of the control element can be easily determined by making use of the capability of the multi-touch sensing display to determine the position of an input event. A precise adjustment of the parameter value may thus be enabled.

The input device may be connected to an audio mixing device. The above-mentioned parameter may then control a function of the audio mixing device. As audio mixing devices generally require the adjustment of a multitude of parameters, using the input device to control functions of the audio mixing device is advantageous. This is particularly true as the input device may be adapted to display the functionality and a parameter value associated with a particular control element on said multi-touch sensing display. Thus, in the case where a plurality of control elements is provided on the input device, an efficient configuration of the input device can be performed and an ergonomic adjustment of parameters for the audio mixing device can be achieved.

According to a further embodiment, the multi-touch sensing display comprises one of a capacitive touchscreen panel, an inductive touchscreen panel, or a total internal reflection based touchscreen panel. Such touchscreen panels may be adapted to detect simultaneous touches and may be used with the present invention.

According to yet another embodiment, the multi-touch sensing display comprises a display unit with an integrated array of optical sensors. The display unit may for example be a liquid crystal display (LCD) unit. The optical sensors may be capable of detecting touches or near touches to the surface. As a large number of sensors may be arranged in the display unit with relatively small spacing in-between them, a high resolution for the detection of simultaneous touches or near touches can be achieved. Further, in such a configuration, the upper surface of the multi-touch sensing display may be manufactured out of a scratch resistant transparent surface, such as glass. Such a surface may further facilitate the mounting of a mechanical control element.

The multi-touch sensing display may be adapted to display an indication regarding a value or a type of a parameter controlled by the mechanical control element within a predetermined region adjacent to the mechanical control element. The association of a particular functionality with a control element and the adjustment of a parameter value are thus facilitated.

According to another aspect of the invention, a method of detecting a user input with an input device comprising a multi-touch sensing display adapted to detect multiple simultaneous touches or near touches to a surface of the multi-touch sensing display as distinct input events and at least one mechanical control element arranged on the surface of the multi-touch sensing display is provided. According to the method, an input event is generated in response to an actuation of the at least one mechanical control element, and the input event is detected by the multi-touch sensing display. A parameter associated with the at least one mechanical control element is adjusted in accordance with the detected input event. Similar advantages as outlined above with respect to the input device are also achieved with the inventive method of detecting a user input.

According to an embodiment, at least two mechanical control elements are provided on the input device, the method comprising a detecting of at least one separate input event for each of the at least two mechanical control elements in response to a simultaneous actuation of the least two mechanical control elements. In accordance with the input event detected for the respective mechanical control element, a parameter associated with the mechanical control element is adjusted. Such a method may enable a simultaneous control of a plurality of parameters with the input device.

The detecting of an input event may comprise a determining of a position on the surface of the multi-touch sensing display at which the input event occurred and a determining of a setting of the parameter associated with the mechanical control element on the basis of the determined position. A setting of a parameter may thus be simply adjusted by making use of the capability of the multi-touch sensing display to determine a position at which a touch or a near touch occurred.

According to a further embodiment, the actuation of the control element comprises a moving of a trigger element arranged on the control element relative to the surface. An input event is generated by reflecting and/or scattering light off the trigger element onto optical sensors in response to the moving of the trigger element. The optical sensors are provided in the multi-touch sensing display adjacent to the surface. The detecting of an input event comprises a detection of said light by the optical sensors. As an example, an array of photosensitive elements may be arranged underneath the surface. The trigger element may then be a reflecting or absorbing element, a movement of which relative to the surface will be detected by a change of the intensity of light detected by particular photosensitive elements. The position or a change in position of the trigger element may thus be determined. With such a method, an adjustment of the parameter with high resolution without contact between the surface and the trigger element can be achieved.

According to a further embodiment, the actuation of the control element comprises a moving of a trigger element arranged on the control element relative to the surface. The generating of an input event comprises a disturbing of an electrical field established adjacent to the surface by the movement of the trigger element. The detecting of the input event comprises a detecting of a position at which the disturbance of the electrical field occurred. Such a method may for example by performed by using a multi-touch sensing display comprising a capacitive touchscreen panel.

According to another aspect of the invention, an audio console comprising at least one of the above-mentioned input devices is provided. Such an audio console has the advantage that a plurality of parameters can be effectively and ergonomically adjusted.

In an embodiment of the audio console, the input device comprises a plurality of mechanical control elements arranged in an array and regions sensitive to simultaneous touches or near touches between said elements. The multi-touch sensing display is further configured to display information relating to parameters associated with the plurality of mechanical control elements in the regions. It may for example display a type and a value of a parameter associated with a control element next to the control element. The control elements are thus easily configurable, whereas relevant information relating to associated parameters is provided to a user. The user may further effectuate further user inputs by making use of the touch-sensitive areas adjacent to the control elements. A very comprehensive and flexible control of the audio console is thus achieved.

In view of the above, an input device is provided for detecting user input. An example input device includes a multi-touch sensing display configured to detect multiple simultaneous triggers on a surface of the multi-touch sensing display as distinct input events. The input device also includes at least one mechanical control element arranged on the surface of the multi-touch sensing display. The at least one mechanical control element is configured to generate an input event. The input event is detected by the multi-touch sensing display in response to actuation of the at least one mechanical control element.

A method for detecting user input with an input device is also provided. An example method may be implemented using an input device having a multi-touch sensing display adapted to detect multiple simultaneous touches or near touches to a surface of the multi-touch sensing display as distinct input events. The input device includes at least one mechanical control element arranged on the surface of the multi-touch sensing display. An example method includes generating an input event and detecting the input event by the multi-touch sensing display in response to an actuation of the at least one mechanical control element. A parameter associated with the at least one mechanical control element is then adjusted in accordance with the detected input event.

Those skilled in the art will appreciate that the features mentioned above and those yet to be explained below can be used not only in the respective combinations indicated, but also in other combinations or in isolation, without leaving the scope of the present invention. The above-described methods may be implemented in a device for processing audio signals, or examples implementations may include steps described with respect to the device for processing audio signals.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

Example implementations of the invention are described below with reference to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
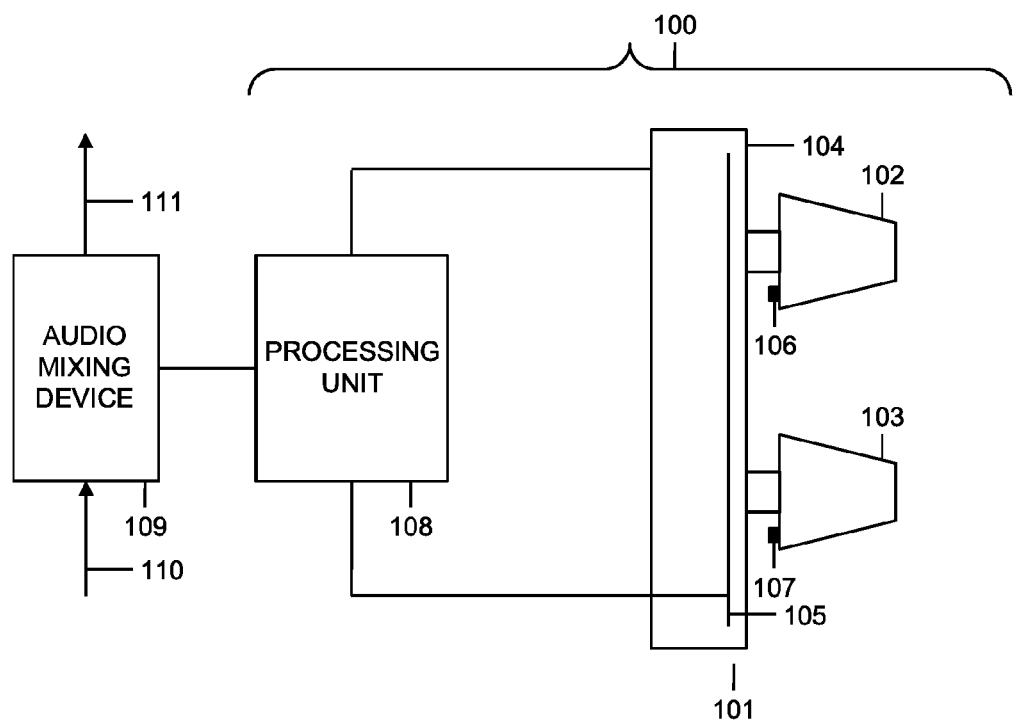
FIG. 1 is a schematic diagram of an example of an input device.

FIG. 1 is a schematic diagram of an example of an input device 100. The input device 100 includes a multi-touch sensing display 101 and two mechanical control elements illustrated in FIG. 1 as including two rotary knobs 102 and 103. The rotary knobs 102 and 103 in FIG. 1 are fixedly mounted to a surface 104 of the multi-touch sensing display 101. Below the surface 104, the multi-touch sensing display 101 includes an array of optical sensors or photosensitive elements represented in FIG. 1 as a line 105. The multi-touch sensing display 101 may for example be a thin film transistor (TFT) LCD display. The TFT LCD display includes integrated photosensitive elements. Such displays are known in the art. Documents describing TFT LCD displays having integrated photosensitive elements include an article titled "Active matrix LCD with integrated optical touchscreen," www.planar.com/advantages/whitepapers/docs/planar-AM-LCD-Optical-Touchscreen.pdf, which is incorporated by reference. Light emitted by the multi-touch sensing display 101 may be absorbed, scattered or reflected by trigger elements 106 and 107. If one of the control elements 102 or 103 is actuated by turning, the intensity of light reflected onto photosensitive elements located underneath the trigger element 106 or 107 at the previous and the new position of the trigger element changes. The change in intensity generates an input event. Such an input event may be detected by the multi-touch sensing display 101 as a change of photocurrent, or a change of the current through the array of photosensitive elements 105.

It is to be understood that the multi-touch sensing display 101 may be configured to include mechanisms for determining the position where the input event has occurred on its surface as well as for generating a position-dependent signal in response to an input event Such mechanisms may include a processor and other hardware and/or software suitably configured. Referring to FIG. 1, the multi-touch sensing display 101 may therefore deliver signals corresponding to sensor data that may be used by a processing unit 108 to determine an occurrence and position of an input event. The multi-touch sensing display 101 may also directly deliver the position of a detected input event, such as for example, as two dimensional (for example, x and y) coordinates relative to the surface. The setting of the control element that generates the input event may then be determined by the processing unit 108.

The processing unit 108 is connected to provide the multi-touch sensing display 101 with processing resources. The processing unit 108 in FIG. 1 provides the display signal to the multi-touch sensing display 101 and reads out the state of the array of photosensitive elements of the multi-touch sensing display 101. A readout of the array of photosensitive elements 105 may be performed at predetermined times. At such times, the processing unit 108 may obtain an image of light intensities detected by the photosensitive elements 105 at their respective positions on the surface 104 of display 101. The processing unit 108 may analyze the image data to determine a position in the data at which a change in intensity occurred. The processing unit 108 may be provided with information that includes the type of control element located at a given position, and the function currently assigned to the respective control element. By determining the position of an input event and the position of the trigger element relative to the surface 104, the processing unit 108 may determine the setting of the control element and assign a corresponding value to a parameter of the function controlled by the control element. It is to be understood that a particular setting of the control element need not correspond to a particular value of an associated parameter, but that activation of the control element by, for example, rotation through a particular angle may define a corresponding change of the parameter value.

The actual position of trigger elements 106 and 107 may be detected by the photosensitive elements of the multi-touch sensing display 101 and determined by processing unit 108. The input device 100 may detect simultaneous actuation of the control elements 102 and 103 as separate or distinct input events, which may involve resolving the positions relative to the surface at which the input events occurred. The input device 100 may also detect a touch or a near-touch to the surface 104 in areas of the multi-touch sensing display 101 that are not covered by the control elements or provided with the optical sensors. The processing unit 108 may also control the multi-touch sensing display 101 to display information, such as for example, the type and the value of the parameter controlled by the control element 102 or 103. The information may be displayed next to the respective control element 102 or 103. FIG. 1 shows an example implementation that uses optical sensors so that the surface 104 is made of a transparent material, such as glass. With a glass surface, the rotary knobs 102 and 103 may be mechanically mounted on the surface 104 using an adhesive, for example.

The input device 100 in FIG. 1 is coupled to an audio mixing device 109 to allow the user to control parameters for operating the audio mixing device 109. For example, the values of parameters that may be adjusted using the control elements 102 and 103 are provided to the audio mixing device 109. The audio mixing device 109 includes a plurality of audio inputs 110 and outputs 111 for communicating audio signals. The audio mixing device 109 processes the audio input signals 110 in accordance with parameters received from processing unit 108. Audio mixing devices, such as for example, a digital mixer, are known in the art and require no further description.

The example input device 100 in FIG. 1 has been described as including the multi-touch sensing display 101 having optical sensors 105, however, other types of touchscreens may be used as well. For example, capacitive or resistive touchscreen panels may also be used. Parameter values may also be provided to any type of device by the processing unit 108. For example, parameters may be relevant to a control station for a machine, a power plant, or any other electronic device, such as a computer or a station for video processing, or any other device connected to the input device 100. The multi-touch sensing display 101 of input device 100 may display information relating to the function controlled by a control element as well as data and information provided by a device connected to the input device 100.

Figure 2:
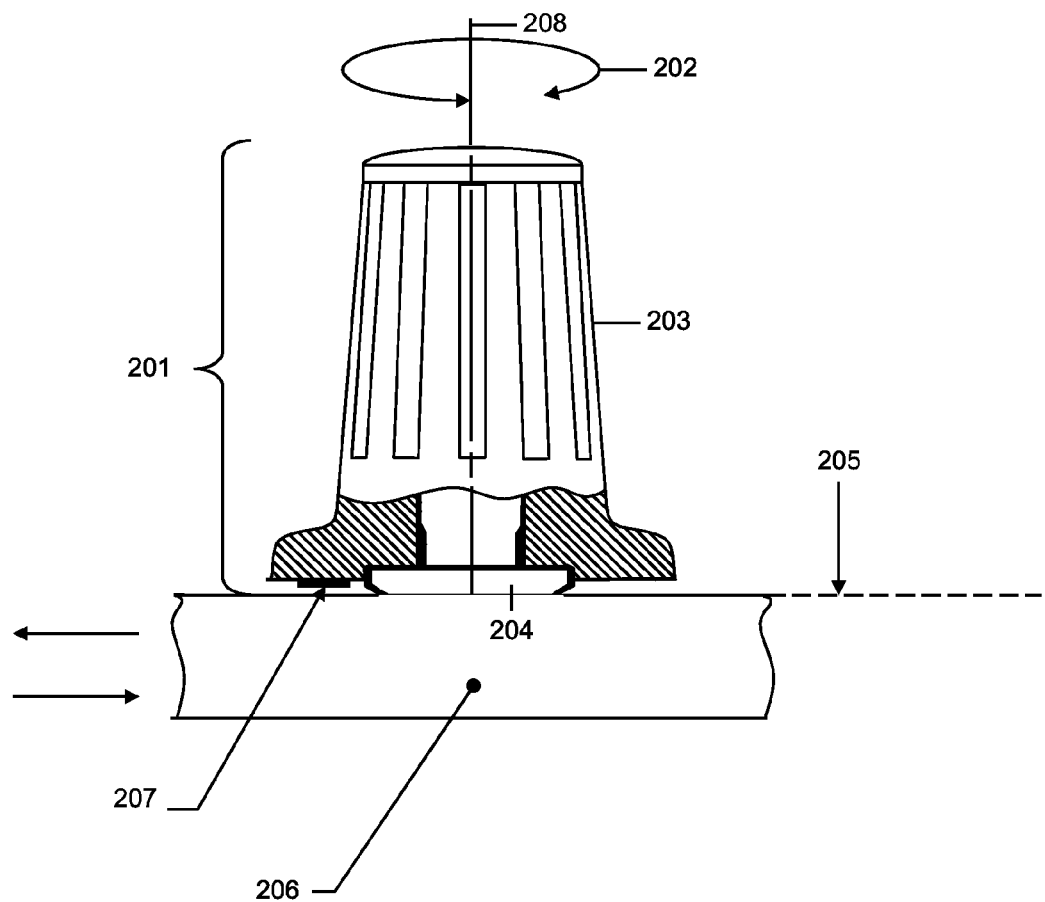
FIG. 2 is a schematic diagram of an example of an input device having a rotary knob as a mechanical control element.

FIG. 2 is a schematic diagram of an example of an input device having a rotary knob 201 as a mechanical control element. The rotary knob 201 may be turned in two directions as indicated by arrow 202. The rotary knob 201 includes a movable component 203 and a shaft with a base 204 fixedly mounted to a surface 205 of the multi-touch sensing display 206. The shaft and base 204 are mounted by an adhesive to surface 205. The moveable component 203 rotates on the shaft 205. This rotation moves the trigger element 207 in a plane substantially parallel to the surface 205. The distance between the trigger element 207 and the surface 205 is determine to permit detection of the position of the trigger element 207 by the multi-touch sensing display 206. The turning of the rotary knob 201 generates subsequent input events at positions lying on a circle around the rotary axis 208 of the rotary knob 201.

Figure 3:
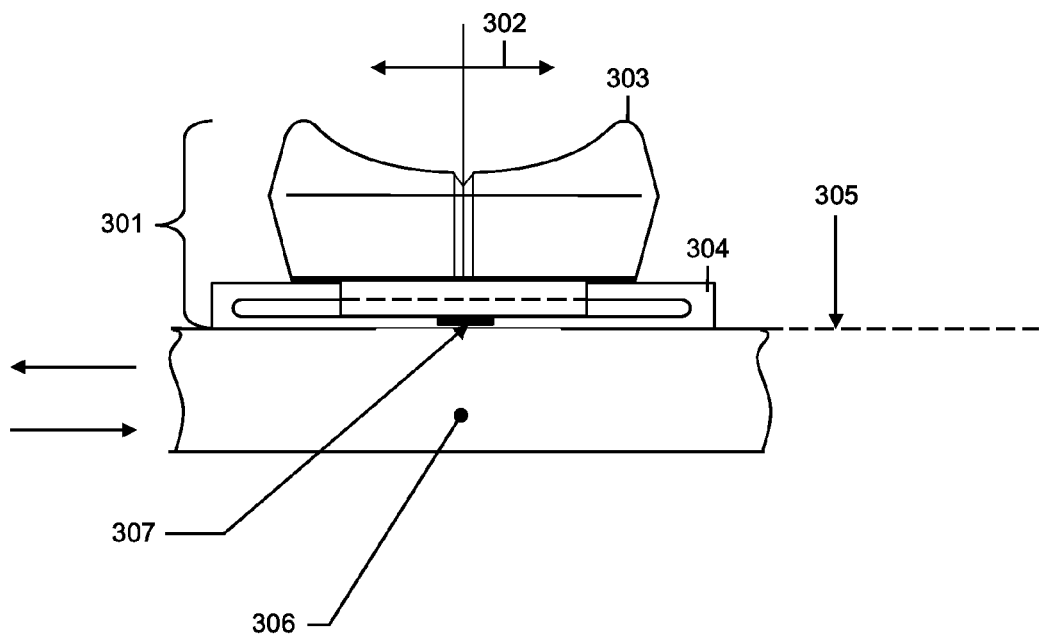
FIG. 3 is a schematic diagram of an example of an input device having a sliding controller as a mechanical control element.

FIG. 3 is a schematic diagram of an example of an input device using a sliding controller 301 as a mechanical control element. The sliding controller 301 includes a movable component 303 that slides linearly in a direction horizontal with respect to a surface 305 of the multi-touch sensing display 306 (along arrow 302). The moveable component 303 is movable within a support structure 304 that is fixedly mounted to the surface 305. As described above with reference to FIG. 1, the support structure 304 may be mounted to the surface 305 using a variety of techniques and fixing components including gluing or cementing: engaging elements of the support structure 304 with a recess formed on the surface 305; providing one or more holes through the multi-touch sensing display 306 to attach the support structure 305 using bolts, screws, and the like. Actuation of the control element, by moving the sliding control 301, results in a movement of a trigger element 307 fixed to the movable component 303 in a horizontal direction relative to the surface 305. The spacing between the trigger element 307 and the surface 305 is again determined to permit detection of the trigger element 307 by the multi-touch sensing display 306. The spacing will depend on the particular detection mechanism employed. When using optical sensors or a capacitive touch screen panel, the trigger element 307 may not touch surface 305. When using a resistive touchscreen panel or a method based on total internal reflection, the trigger element 307 may touch the surface 305. Actuation of the sliding control 301 results in the generation of input events at positions on the surface 305 along a line. The movement of the sliding controller 301 may be inferred by detecting the positions of the input events. A value of an associated parameter may then be changed accordingly.

Figure 4:
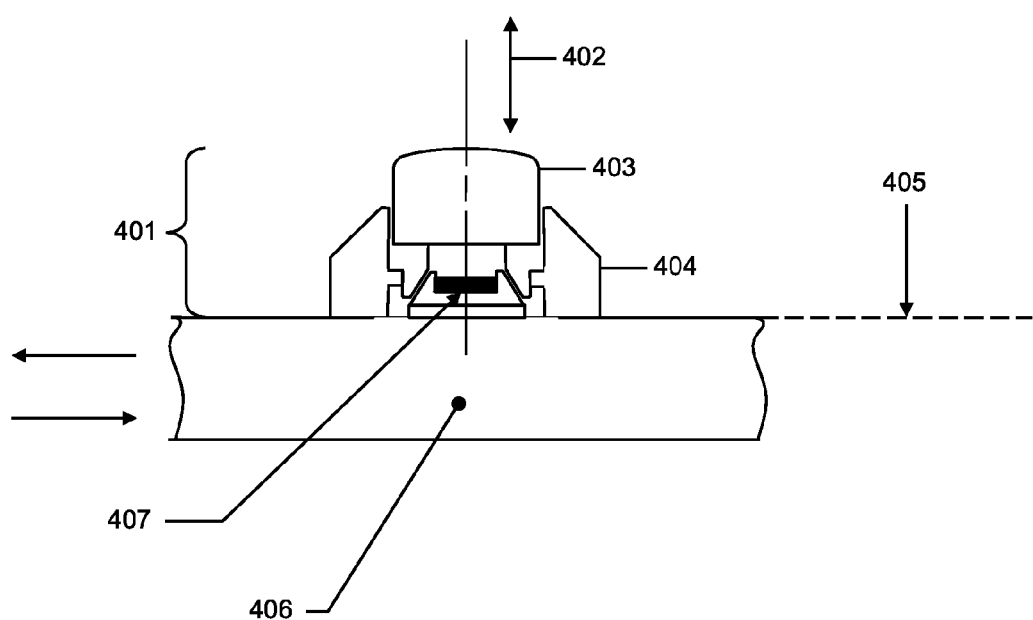
FIG. 4 is a schematic diagram of an example of an input device having a push button as a control element.

FIG. 4 is a schematic diagram of an example of an input device using a push button 401 as a control element. The push button 401 includes a movable component 403 that moves in a direction indicated by arrow 402, which is substantially perpendicular to a surface 405 of the multi-touch sensing display 406. A trigger element 407 is mounted on the movable component 403 a variable distance to the surface 405, the distance varied by moving the movable component 403. The movable component 403 of the push button 401 is supported by a supporting structure 404 fixedly mounted to surface 405. The push button 401 is actuated by applying pressure to the movable component 403. The distance between the trigger element 407 and the surface 405 is decreased eventually triggering an input event. The distance between the trigger element 407 and the surface 405 depends on the specific multi-touch sensing display 406, on a first distance to an un-pushed state and a second distance to a pushed state. A calibrating procedure may be implemented to adjust the first and second distances. In one example, the intensity of light detected by optical sensors underneath the surface 405 may increase or decrease in the pushed position, without having the trigger element 407 touch the surface 405. In the non-actuated state, the multi-touch sensing display 406 may still be able to determine the position of the trigger element 407. The distance to the surface 405 is sufficient to allow the trigger element 407 to generate an input event when the push button 401 is actuated.

Figure 5:
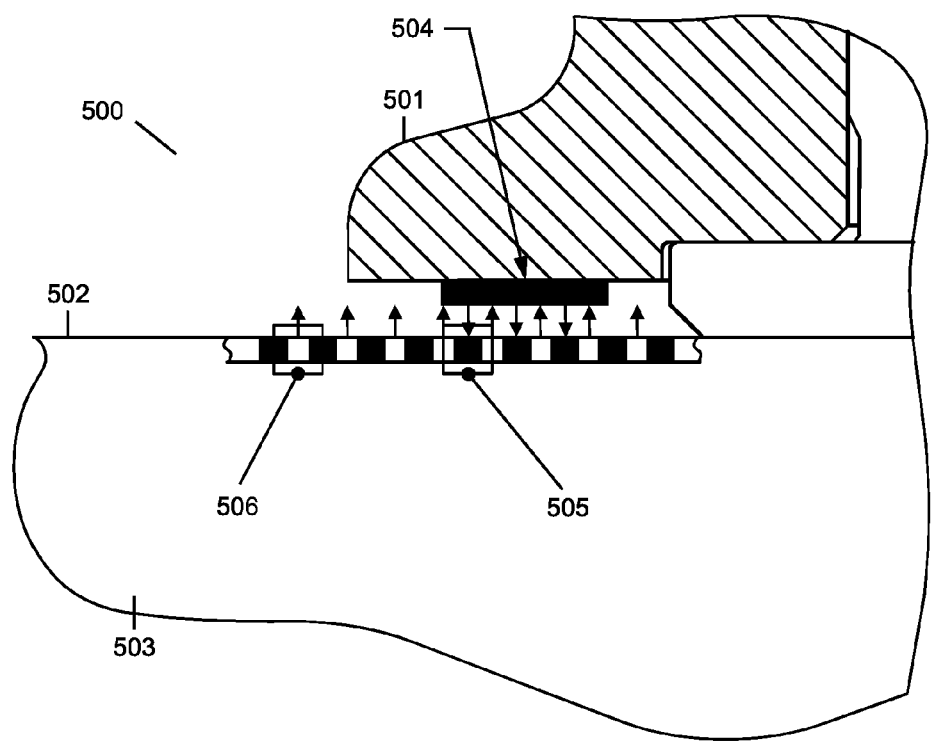
FIG. 5 is a schematic diagram of an example of an input device using photosensitive elements for detecting actuation of a control element.

FIG. 5 is a schematic diagram of an example of an input device 500 using photosensitive elements for detecting actuation of a control element. The input device 500 of FIG. 5 includes a control element implemented as a rotary knob 501. The rotary knob 501 is mounted to a surface 502 of a multi-touch sensing display 503. The multi-touch sensing display 503 includes photosensitive pixels 505 (shown as black squares) and display pixels 506 (shown as white squares). The display pixels 506 emit light, as indicated by arrows when displaying an image. The emitted light is reflected by a reflective trigger element 504 mounted to the rotary knob 501. The reflected light is detected by the photosensitive pixels 505 (as indicated by the arrows received by the photosensitive pixels 505). The position of the reflective trigger element 504 relative to the surface 502 may be detected by the photosensitive pixels 505 and determined by reading out the detected intensity values and analyzing the intensity distribution. As shown in FIG. 5, the remaining surface of the rotary knob 501 facing surface 502 may be non-reflective, or light absorptive, for the light emitted by the multi-touch sensing display 503. The emission of light by the display pixels 506 located in the area of the surface 502 over which the trigger element 504 may be moved may be controlled such that the display pixels 505 emit light with a predetermined intensity, for example, near maximum intensity, so that a high signal may be received from photosensitive pixels 505, and the position of the trigger element may be precisely determined. It is to be understood that other implementations are also possible, such as providing an absorptive trigger element and a reflective surface of the control element 501 facing the surface 502 of the display 503.

Figure 6:
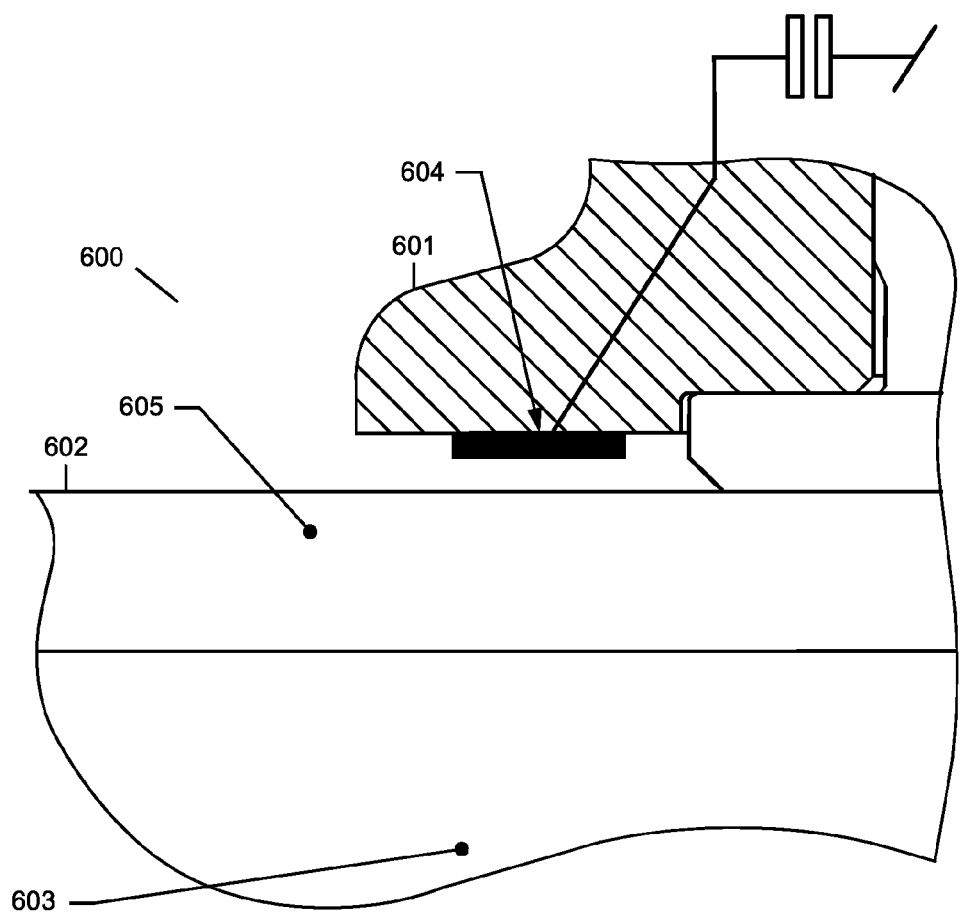
FIG. 6 is a schematic diagram of an example of an input device using a capacitive element for triggering an input event.

FIG. 6 is a schematic diagram of an example of an input device 600 using a capacitive element for triggering an input event. The input device 600 includes at least one control element implemented in FIG. 6 as a rotary knob 601. The multi-touch sensing display 603 includes a capacitive touchscreen panel having a capacitance sensitive layer 605. Capacitive multi-touch sensing displays are known to those of ordinary skill in the art and will not be explained in further detail. More details on the operation of a capacitive multi-point touchscreen can be found, for example, in the US Patent Publication US 2006/00917991 A1, which is incorporated by reference in its entirety.

A conventional capacitive touchscreen panel may for example include a capacitive sensing layer of a metal oxide, such as indium tin oxide, which conducts an electrical current across the sensor panel. The current is applied by electrodes on each corner of the panel, in one example, with a square wave signal. When the panel is touched, a charge transport occurs, which can be measured as a current at the corners of the panel. The position of the touch event may be determined by evaluating the resulting currents at the corners of the panel. To detect multiple simultaneous touches, the touchscreen panel may include a plurality of transparent sensor nodes which may again be formed of a conductive medium such as a metal oxide, spatially separated into electrodes and traces. Different coordinates on the display may then be represented by the different electrodes, and the traces are used to connect the electrodes to a capacitive sensing circuit. A change of a capacitance occurring at a particular electrode may then be recognized, and by using a plurality of electrodes, the positions of simultaneously occurring touches may be resolved. Referring to FIG. 6, a capacitive trigger element 604 is provided to trigger an input event. The trigger element 604 disturbs an electrical field established adjacent to a sensing node of capacitive sensitive layer 605 at a position underneath the trigger element 604. The disturbance may be detected as a change in capacitance at the sensing node. The position of the trigger element 604 relative to the surface 602 may then be determined. Actuation of the control element 601 results in a change of capacitance of another sensing node, which again generates an input event at a position relative to surface 602, which can be determined by a capacitive sensing circuit. The capacitive trigger element 604 may be grounded, or may be grounded when a user touches the control element 601. The sensing nodes of the capacitive multi-touch sensing panel may also be arranged to achieve a high resolution of the positioning of trigger element 604. For example, high resolution may be achieved by closely spacing the sensing nodes in proximity to the control element. Again, multi-touch sensing display 603 is capable of sensing a simultaneous actuation of the control element 601 and a touch to the surface 602 while also displaying information.

Figure 7:
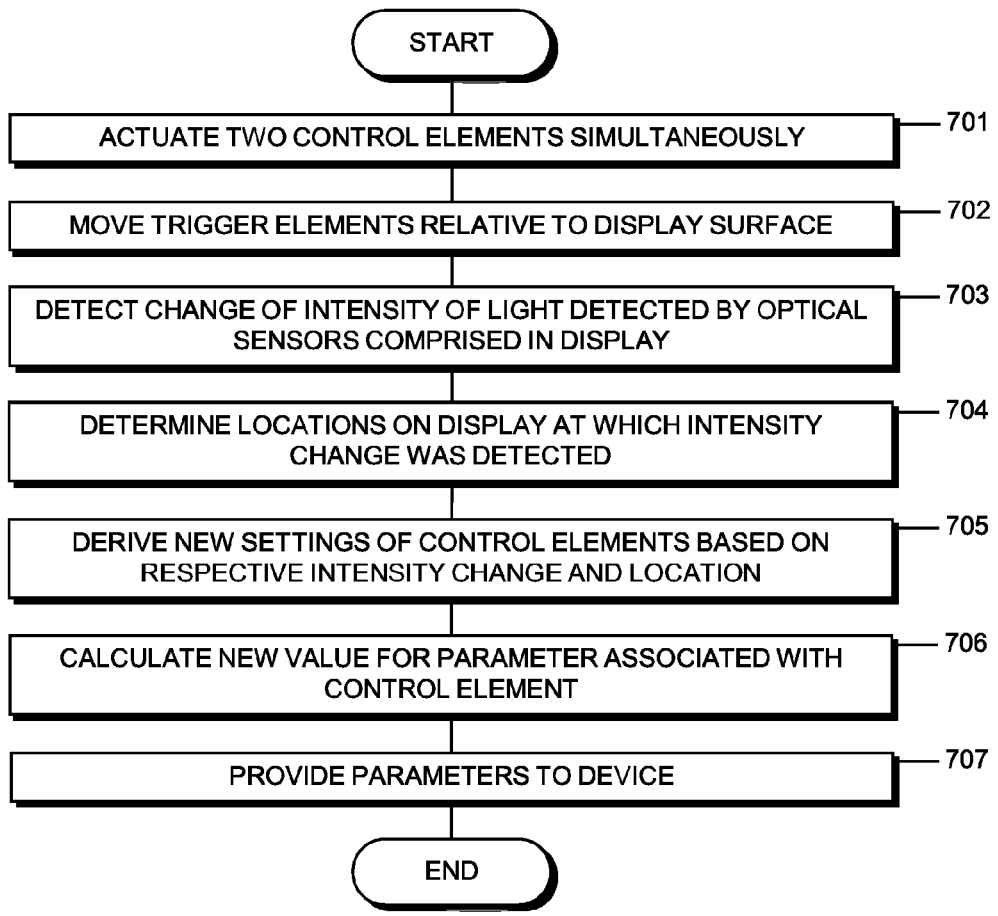
FIG. 7 is a flowchart illustrating operation of an example method for detecting multiple simultaneous touches or near touches of a multi-touch sensing device.

FIG. 7 is a flowchart illustrating operation of an example method for detecting multiple simultaneous touches or near touches of a multi-touch sensing device. In an example, the method may be performed using the input device of FIG. 1 or FIG. 5. In step 701, two control elements are actuated simultaneously. It is to be understood that these elements may be any type of control elements, such as rotary knobs, sliders, rockers, push buttons, and similar devices. By actuating the control elements, trigger elements of the control elements are moved relative to the display surface at step 702. Optical sensors located in the display may detect light emitted by the display and reflected by the trigger elements. The movement of the trigger element results in a change in the intensity of the light detected by the optical sensors, which is detected in step 703. The locations or positions on the display at which the intensity changes occurred may be determined in step 704. A new setting for each control element is determined in step 705 on the basis of the respective intensity change and its location. For example, it may be determined that a slider was moved a particular distance or that a rotary knob was turned through a particular angle. Alternatively, the absolute setting of the control element may be determined, such as for example, a new position of a slider or of a rotary knob. A new value for a parameter associated with the control element is then calculated in step 706 on the basis of the derived new setting for each control element. For example, a particular switching function may have been assigned to a push button, and an associated parameter value may be changed from '1' to signify an 'ON' position to a '0' to signify an 'OFF' position upon actuation. The parameter value may also be adjusted according to a determined travel distance or turn angle of a control element, or to the determined absolute new setting of the control element. The parameters with their values are then provided to a device connected to the input device in step 707. It is to be understood that the above method may include additional steps, such as for example a step of detecting a touch to a surface adjacent to a control element and adjusting a parameter on the basis of the detected touch, or changing the function of a control element in accordance with a position of a detected touch. Graphical control elements may also be provided and functions of the mechanical control elements changed accordingly.

Figure 8:
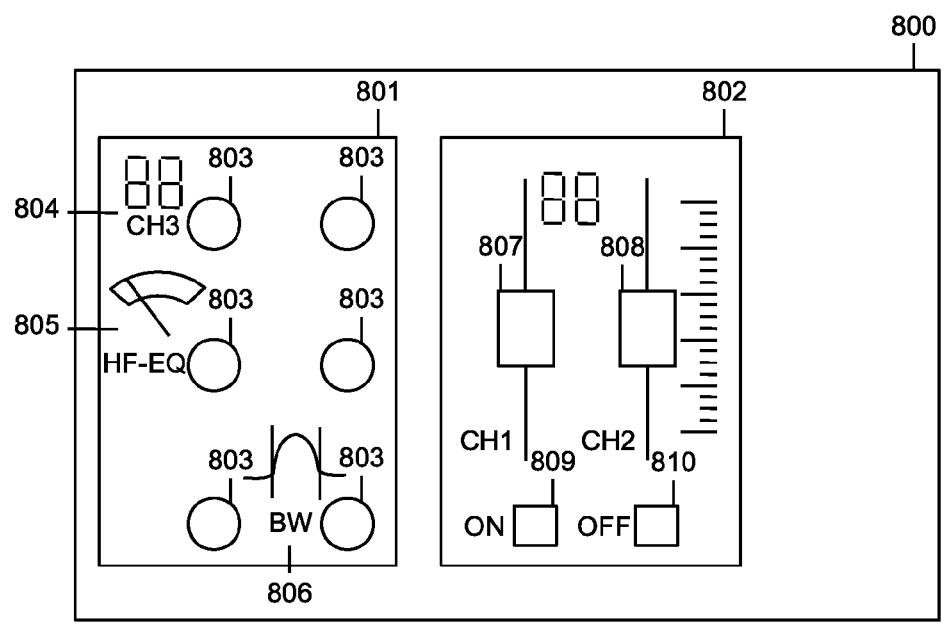
FIG. 8 is a schematic diagram of an example of an audio console.

FIG. 8 is a schematic diagram of an example of an audio console 800. The audio console 800 in FIG. 8 includes two input devices 801 and 802. The input device 801 of audio console 800 includes a plurality of mechanical control elements implemented as rotary buttons 803. The input devices 801 and 802 are shown in a view from above, as indicated by arrow 205 in FIG. 2.

The portions of input devices 801 and 802 that are visible to a user are touch-sensitive and are configured to display information. The input device 801 includes areas 804, 805 and 806 adjacent to rotary knobs 803. The areas 804, 805, 806 may be used to display the type of parameter and the parameter value that is currently being adjusted by the respective rotary knob 803. In the example shown in FIG. 8, area 804 indicates the adjustment of a numerical value for a particular channel, area 805 indicates the adjustment of a high frequency equalizer using a needle indicator, and area 806 indicates the adjustment of a bandwidth.

The input device 802 includes sliding controls 807 and 808, which may be for example, faders, with graphical indications on a channel to be adjusted and of a present setting provided next to them. The input device 802 includes push buttons 809 and 810 with their present setting indicated graphically in an area adjacent to them. Although control elements 807 to 810 are mechanical control elements, it is to be understood that some of these may also be implemented as graphical control elements, which may be actuated by touching the surface of input device 802 at a position where the control element is displayed.

Those of ordinary skill in the art will understand that different types of mechanical and graphical control elements may be arranged on a touch-sensitive surface of the input device, and that mechanical control elements other than the ones mentioned above may be used. Apart from being used in an audio console 800, input devices according to example implementations may also be used in other devices such as control stations of a factory or a power plant.

Those of ordinary skill in the art will also understand that the types of multi-touch sensing displays used are not limited to those described above. Other types of displays may be used, such as for example, infrared touchscreen panels, strain gauge touchscreen panels, surface acoustic wave or diffused laser imaging touchscreen panels, and the like. These panels should be adapted in a manner similar to the examples described above to recognize multiple simultaneous touches.

It will be understood, and is appreciated by persons skilled in the art, that one or more processes, sub-processes, or process steps described in connection with FIGS. 1-8 may be performed by hardware and/or software under the control of a processor, such as processing unit 108 in FIG. 1. If the process is performed by software, the software may reside in software memory (not shown) in a suitable electronic processing component or system such as the processing unit 108 in FIG. 1. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of example implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. An input device comprising:
    a multi-touch sensing display configured to detect multiple simultaneous triggers on a surface of the multi-touch sensing display as distinct input events; and
    a plurality of rotary knobs arranged on the surface of the multi-touch sensing display, a first rotary knob of the plurality of rotary knobs configured to generate an input event in response to a first user input that is indicative of a first function, the input event being detected by the multi-touch sensing display in response to actuation of the first rotary knob,
    wherein the multi-touch sensing display is configured to indicate a value of or a type of a parameter controlled by the first rotary knob within a predetermined region directly adjacent to the first rotary knob,
    wherein an area surrounding the first rotary knob is touch-sensitive for receiving a second user input that is indicative of a second function, the first function being different from the second function,
    wherein the plurality of rotary knobs are fixedly mounted to the surface of the multi-touch sensing display, and
    wherein each of the plurality of rotary knobs comprises a movable component and a shaft, and
    wherein each rotary knob revolves around the shaft that is attached to a base that is attached to the surface of the multi-touch sensing display.

2. The input device of claim 1 where the multi-touch sensing display is configured to detect multiple simultaneous triggers that include touches, near-touches, or a combination thereof as distinct input events.

3. The input device of claim 1 comprising:
    at least two rotary knobs of the plurality of rotary knobs, where the multi-touch sensing display is adapted to detect a simultaneous actuation of the at least two rotary knobs as separate input events.

4. The input device of claim 1 where the first rotary knob includes a trigger element that triggers the input event when the trigger element touches or comes within a predetermined distance of the surface at a position, where the multi-touch sensing display is adapted to detect the position at which the input event is triggered.

5. The input device of claim 4 where the first rotary knob includes a movable component, the trigger element being arranged on the movable component such that when actuating the first rotary knob by moving the movable component, the multi-touch sensing display detects the movement of the trigger element relative to the surface.

6. The input device of claim 5 where the movable component is configured to move the trigger element in a plane substantially parallel to the surface at a distance to the surface at which it triggers an input event when actuating the first rotary knob, so that input events are successively triggered for different positions at the surface.

7. The input device of claim 1 further comprising:
    a processing unit, where the multi-touch sensing display is configured to detect a position of the input event generated by the first rotary knob and where the processing unit is adapted to assign a value to a parameter controlled by the first rotary knob in dependence on the position at which the input event was detected.

8. The input device of claim 7 where the input device is connected to an audio mixing device, the parameter controlling a function of the audio mixing device.

9. The input device of claim 1 where the multi-touch sensing display includes one of a capacitive touchscreen panel, an inductive touchscreen panel, and a total internal reflection based touchscreen panel.

10. The input device of claim 1 where the multi-touch sensing display includes a display unit with an integrated array of optical sensors.

11. The input device of claim 10 where the integrated array of optical sensors includes a liquid crystal display unit.

12. A method of detecting a user input with an input device comprising a multi-touch sensing display adapted to detect distinct input events and a plurality of rotary knobs arranged on a surface of the multi-touch sensing display, the method comprising:
    in response to an actuation of a first rotary knob of the plurality of rotary knobs related to a first user input that is indicative of a first function, generating an input event and detecting the input event by the multi-touch sensing display;
    adjusting a parameter associated with the first rotary knob in accordance with the detected input event;
    indicating a value of, or a type of parameter controlled by the first rotary knob within a predetermined region adjacent to the first rotary knob; and
    detecting, at an area surrounding the first rotary knob, a second user input that is indicative of a second function, the area being touch-sensitive for receiving the second user input and the first function being different from the second user input, wherein the plurality of rotary knobs are fixedly mounted to the surface of the multi-touch sensing display,
wherein each rotary knob is fixedly mounted to the surface of the multi-touch sensing display, and
wherein each rotary knob includes a shaft that is attached to a base that is attached to a surface of the multi-touch sensing display.

13. The method of claim 12 where the input device includes at least two rotary knobs, the method further comprising:
in response to a simultaneous actuation of the at least two rotary knobs, detecting at least one separate input event for each of the at least two rotary knobs by the multi-touch sensing display; and
for each of the at least two rotary knobs, adjusting a parameter associated with the rotary knob in accordance with the input event detected for the respective rotary knob.

14. The method of claim 12 where the detecting of an input event includes the steps of:
determining a position on the surface of the multi-touch sensing display at which the input event occurred; and
determining a setting of the parameter associated with the first rotary knob on the basis of the determined position.

15. The method of claim 12 where the actuation of the first rotary knob includes moving a trigger element arranged on the first rotary knob relative to the surface, and where:
the step of generating the input event includes the step of reflecting or scattering light off the trigger element onto optical sensors in response to the moving of the trigger element, the optical sensors being disposed adjacent to the surface of the multi-touch sensing display; and
the step of detecting the input event includes the step of detecting the light by the optical sensors.

16. The method of claim 12 where the actuation of the first rotary knob includes moving a trigger element arranged on the first rotary knob relative to the surface, where:
the step of generating an input event includes the step of disturbing an electrical field established adjacent to the surface by movement of the trigger element, and the step of detecting the input event includes the step of detecting a position at which the disturbance of the electrical field occurred.

17. An audio console comprising:
an input device having a multi-touch sensing display configured to detect multiple simultaneous triggers on a surface of the multi-touch sensing display as distinct input events, and a plurality of rotary knobs arranged on the surface of the multi-touch sensing display, a first rotary knob of the plurality of rotary knobs configured to generate an input event in response to a first user input that is indicative of a first command, the input event being detected by the multi-touch sensing display in response to actuation of the first rotary knob,
wherein the multi-touch sensing display is configured to indicate a value of or a type of a parameter controlled by the first rotary knob within a predetermined region adjacent to the first rotary knob,
wherein an area surrounding the first rotary knob is touch-sensitive for receiving a second user input that is indicative of a second function, the first command being different than the second function,
wherein the plurality of rotary knobs are fixedly mounted to the surface of the multi-touch sensing display, and
wherein each rotary knob includes a shaft that is attached to a base that is attached to the surface of the multi-touch sensing display.

18. An audio console comprising:
a multi-touch sensing display adapted to detect multiple simultaneous touches or near touches to a surface of the multi-touch sensing display as distinct input events; and
a plurality of rotary knobs arranged on the surface of the multi-touch sensing display, where a first rotary knob of the plurality rotary knobs is configured such that an actuation of the first rotary knob generates an input event in response to a first user input that is indicative of a first function as detected by the multi-touch sensing display, the audio console being configured to assign a parameter to be controlled to the first rotary knob, to adjust the parameter assigned to the first rotary knob in accordance with an input event detected for the first rotary knob, and to display an indication of a setting or type of the parameter adjacent to the first rotary knob,
wherein an area surrounding the first rotary knob is touch-sensitive for receiving a second user input indicative of a second function, the first function being different than the second function,
wherein the plurality of rotary knobs are fixedly mounted to the surface of the multi-touch sensing display, and
wherein each rotary knob includes a shaft that is attached to a base that is attached to the surface of the multi-touch sensing display.

19. The audio console of claim 18 where the first rotary knob includes a movable component and a trigger element arranged on the movable component such that when actuating the first rotary knob by moving the movable component, the multi-touch sensing display detects the movement of the trigger element relative to the surface.

20. An input device comprising:
a multi-touch sensing display configured to detect multiple simultaneous touches or near touches to a surface of the multi-touch sensing display as distinct input events;
a plurality of rotary knobs arranged on the surface of the multi-touch sensing display, a first rotary knob of the plurality of rotary knobs for generating an input event in response to a first user input that is indicative of a first function; and
a predetermined region on the multi-touch sensing display adjacent to the first rotary knob, the multi-touch sensing display being configured to display an indication of a setting or type of a parameter controlled by the first rotary knob within the predetermined region, wherein the first rotary knob is configured to generate the input event detected by the multi-touch sensing display in response to actuation of the first rotary knob, wherein the input device is configured to adjust a setting of the parameter controlled by the first rotary knob in accordance with the detected input event, wherein an area surrounding the first rotary knob is touch-sensitive for receiving a second user input indicative of a second function, the first function being different than the function, wherein the first rotary knob is fixedly mounted to the surface of the multi-touch sensing display, and wherein each rotary knob includes a shaft that is attached to a base that is attached to the surface of the multi-touch sensing display.

21. The input device of claim 20 where the first rotary knob includes a movable component and a trigger element arranged on the movable component such that when actuating the first rotary knob by moving the movable component, the multi-touch sensing display detects the movement of the trigger element relative to the surface, the input device being configured to adjust the setting of the parameter controlled by the first rotary knob in accordance with the detected movement.

22. The input device of claim 20 where the multi-touch sensing display includes at least one of:
   a capacitive touchscreen panel,
   an inductive touchscreen panel,
   an integrated array of optical sensors, and
   a total internal reflection based touchscreen panel.

\* \* \* \* \*